(12) United States Patent
Barzegar et al.

(10) Patent No.: US 10,225,841 B2
(45) Date of Patent: *Mar. 5, 2019

(54) REMOTE DISTRIBUTED ANTENNA SYSTEM

(71) Applicant: AT&T Intellectual Property I, L.P., Atlanta, GA (US)

(72) Inventors: Farhad Barzegar, Branchburg, NJ (US); Donald J. Barnickel, Jr., Flemington, NJ (US); George Blandino, Bridgewater, NJ (US); Irwin Gerszberg, Kendall Park, NJ (US); Paul Shala Henry, Holmdel, NJ (US); Thomas M. Willis, III, Tinton Falls, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,638

(22) Filed: Feb. 5, 2018

(65) Prior Publication Data

US 2018/0160430 A1 Jun. 7, 2018

Related U.S. Application Data

(63) Continuation of application No. 15/158,798, filed on May 19, 2016, now Pat. No. 9,930,668, which is a continuation of application No. 13/907,246, filed on May 31, 2013, now Pat. No. 9,525,524.

(51) Int. Cl.
*H04L 12/28* (2006.01)
*H04W 72/04* (2009.01)
(Continued)

(52) U.S. Cl.
CPC ........ *H04W 72/0453* (2013.01); *H01Q 1/246* (2013.01); *H04B 7/155* (2013.01);
(Continued)

(58) Field of Classification Search
USPC ........................... 370/315, 329, 430
See application file for complete search history.

(56) References Cited

U.S. PATENT DOCUMENTS 2,685,068 A 7/1954 Goubau
2,852,753 A 9/1958 Walter et al.
(Continued)

FOREIGN PATENT DOCUMENTS

CN 101390412 3/2009
CN 101938835 1/2011
(Continued)

OTHER PUBLICATIONS

"International Preliminary Report on Patentability", PCT/US2014/039746, dated Dec. 10, 2015.
(Continued)

*Primary Examiner* — John Pezzlo
(74) *Attorney, Agent, or Firm* — Guntin & Gust, PLC; Matthew Tropper

(57) ABSTRACT

A distributed antenna system is provided that frequency shifts the output of one or more microcells to a 60 GHz or higher frequency range for transmission to a set of distributed antennas. The cellular band outputs of these microcell base station devices are used to modulate a 60 GHz (or higher) carrier wave, yielding a group of subcarriers on the 60 GHz carrier wave. This group will then be transmitted in the air via analog microwave RF unit, after which it can be repeated or radiated to the surrounding area. The repeaters amplify the signal and resend it on the air again toward the next repeater. In places where a microcell is required, the 60 GHz signal is shifted in frequency back to its original frequency (e.g., the 1.9 GHz cellular band) and radiated locally to nearby mobile devices.

20 Claims, 9 Drawing Sheets

(51) Int. Cl.
*H04L 5/00* (2006.01)
*H04B 7/26* (2006.01)
*H04B 7/155* (2006.01)
*H01Q 1/24* (2006.01)
*H04L 29/08* (2006.01)
*H04J 1/16* (2006.01)

(52) U.S. Cl.
CPC ....... *H04B 7/15542* (2013.01); *H04B 7/2612* (2013.01); *H04L 5/0003* (2013.01); *H04L 5/0023* (2013.01); *H04L 67/2804* (2013.01)

(56) References Cited

U.S. PATENT DOCUMENTS

| | | | |
|---|---|---|---|
| 2,867,776 A | 1/1959 | Wilkinson, Jr. | |
| 2,912,695 A | 11/1959 | Cutler | |
| 2,921,277 A | 1/1960 | Goubau | |
| 3,201,724 A | 8/1965 | Hafner | |
| 3,566,317 A | 2/1971 | Hafner | |
| 5,889,449 A | 3/1999 | Fiedziuszko | |
| 6,239,377 B1 | 5/2001 | Nishikawa et al. | |
| 7,009,471 B2 | 3/2006 | Elmore | |
| 7,280,033 B2 | 10/2007 | Berkman et al. | |
| 7,345,623 B2 | 3/2008 | McEwan | |
| 7,567,154 B2 | 7/2009 | Elmore | |
| 7,590,404 B1 | 9/2009 | Johnson et al. | |
| 8,159,385 B2 | 4/2012 | Farneth et al. | |
| 8,212,635 B2 | 7/2012 | Miller, II et al. | |
| 8,237,617 B1 | 8/2012 | Johnson et al. | |
| 8,253,516 B2 | 8/2012 | Miller, II et al. | |
| 8,269,583 B2 | 9/2012 | Miller, II et al. | |
| 8,344,829 B2 | 1/2013 | Miller, II et al. | |
| 8,358,640 B1 | 1/2013 | Breau et al. | |
| 8,736,502 B1 | 5/2014 | Mehr et al. | |
| 8,897,697 B1 | 11/2014 | Bennett et al. | |
| 9,113,347 B2 | 8/2015 | Henry | |
| 9,209,902 B2 | 12/2015 | Willis, III et al. | |
| 9,312,919 B1 | 4/2016 | Barzegar et al. | |
| 9,461,706 B1 | 10/2016 | Bennett et al. | |
| 9,490,869 B1 | 11/2016 | Henry | |
| 9,509,415 B1 | 11/2016 | Henry et al. | |
| 9,520,945 B2 | 12/2016 | Gerszberg et al. | |
| 9,525,524 B2 | 12/2016 | Barzegar et al. | |
| 9,544,006 B2 | 1/2017 | Henry et al. | |
| 9,564,947 B2 | 2/2017 | Stuckman et al. | |
| 9,577,306 B2 | 2/2017 | Willis, III et al. | |
| 9,608,692 B2 | 3/2017 | Willis, III et al. | |
| 9,608,740 B2 | 3/2017 | Henry et al. | |
| 9,615,269 B2 | 4/2017 | Henry et al. | |
| 9,627,768 B2 | 4/2017 | Henry et al. | |
| 9,628,116 B2 | 4/2017 | Willis, III et al. | |
| 9,640,850 B2 | 5/2017 | Henry et al. | |
| 9,653,770 B2 | 5/2017 | Henry et al. | |
| 9,680,670 B2 | 6/2017 | Henry et al. | |
| 9,692,101 B2 | 6/2017 | Henry et al. | |
| 9,705,561 B2 | 7/2017 | Henry et al. | |
| 9,705,571 B2 | 7/2017 | Gerszberg et al. | |
| 9,722,318 B2 | 8/2017 | Adriazola et al. | |
| 9,742,462 B2 | 8/2017 | Bennett et al. | |
| 9,748,626 B2 | 8/2017 | Henry et al. | |
| 9,749,053 B2 | 8/2017 | Henry et al. | |
| 9,768,833 B2 | 9/2017 | Fuchs et al. | |
| 9,769,020 B2 | 9/2017 | Henry et al. | |
| 9,780,834 B2 | 10/2017 | Henry et al. | |
| 9,793,951 B2 | 10/2017 | Henry et al. | |
| 9,793,954 B2 | 10/2017 | Bennett et al. | |
| 9,847,566 B2 | 12/2017 | Henry et al. | |
| 9,853,342 B2 | 12/2017 | Henry et al. | |
| 9,860,075 B1 | 1/2018 | Gerszberg et al. | |
| 9,865,911 B2 | 1/2018 | Henry et al. | |
| 9,866,309 B2 | 1/2018 | Bennett et al. | |
| 9,871,282 B2 | 1/2018 | Henry et al. | |
| 9,871,283 B2 | 1/2018 | Henry et al. | |
| 9,876,264 B2 | 1/2018 | Barnickel et al. | |
| 9,876,570 B2 | 1/2018 | Henry et al. | |
| 9,876,605 B1 | 1/2018 | Henry et al. | |
| 9,882,257 B2 | 1/2018 | Henry et al. | |
| 9,893,795 B1 | 2/2018 | Willis et al. | |
| 9,912,381 B2 | 3/2018 | Bennett et al. | |
| 9,917,341 B2 | 3/2018 | Henry et al. | |
| 9,991,580 B2 | 6/2018 | Henry et al. | |
| 9,997,819 B2 | 6/2018 | Bennett et al. | |
| 9,998,172 B1 | 6/2018 | Barzegar et al. | |
| 9,998,870 B1 | 6/2018 | Bennett et al. | |
| 9,999,038 B2 | 6/2018 | Barzegar et al. | |
| 10,003,364 B1 | 6/2018 | Willis, III et al. | |
| 10,009,063 B2 | 6/2018 | Gerszberg et al. | |
| 10,009,065 B2 | 6/2018 | Henry et al. | |
| 10,009,901 B2 | 6/2018 | Gerszberg | |
| 10,027,397 B2 | 7/2018 | Kim | |
| 10,027,427 B2 | 7/2018 | Vannucci et al. | |
| 10,033,107 B2 | 7/2018 | Henry et al. | |
| 10,033,108 B2 | 7/2018 | Henry et al. | |
| 2003/0147655 A1 | 8/2003 | Shattil et al. | |
| 2004/0113756 A1 | 6/2004 | Mollenkopf et al. | |
| 2005/0042989 A1 | 2/2005 | Ho et al. | |
| 2005/0258920 A1 | 11/2005 | Elmore et al. | |
| 2008/0064331 A1 | 3/2008 | Washiro et al. | |
| 2008/0113616 A1 | 5/2008 | Kim et al. | |
| 2008/0211727 A1 | 9/2008 | Elmore et al. | |
| 2008/0252541 A1 | 10/2008 | Diaz et al. | |
| 2008/0279292 A1 | 11/2008 | Tanabe et al. | |
| 2009/0079660 A1 | 3/2009 | Elmore et al. | |
| 2009/0258652 A1 | 10/2009 | Lambert et al. | |
| 2010/0124920 A1 | 5/2010 | Feher et al. | |
| 2010/0159823 A1 | 6/2010 | Smith et al. | |
| 2010/0225426 A1 | 9/2010 | Unger et al. | |
| 2010/0277003 A1 | 11/2010 | Von Novak et al. | |
| 2011/0051780 A1* | 3/2011 | Kawasaki | H04B 1/40 375/135 |
| 2011/0110404 A1 | 5/2011 | Washiro | |
| 2011/0132658 A1 | 6/2011 | Miller, II et al. | |
| 2011/0182174 A1 | 7/2011 | Pi et al. | |
| 2011/0187578 A1 | 8/2011 | Farneth et al. | |
| 2013/0064311 A1 | 3/2013 | Turner et al. | |
| 2014/0233678 A1 | 8/2014 | Campos et al. | |
| 2014/0285277 A1 | 9/2014 | Herbsommer et al. | |
| 2015/0188584 A1 | 7/2015 | Laurent-Michel | |
| 2016/0080839 A1 | 3/2016 | Fuchs et al. | |
| 2016/0112093 A1 | 4/2016 | Barzegar | |
| 2016/0142196 A1 | 5/2016 | Saban et al. | |
| 2016/0164571 A1 | 6/2016 | Bennett et al. | |
| 2016/0182096 A1 | 6/2016 | Panioukov et al. | |
| 2016/0254889 A1 | 9/2016 | Shattil | |
| 2016/0269156 A1 | 9/2016 | Barzegar et al. | |
| 2016/0294517 A1 | 10/2016 | Barzegar et al. | |
| 2016/0315662 A1 | 10/2016 | Henry | |
| 2016/0323015 A1 | 11/2016 | Henry et al. | |
| 2016/0359541 A1 | 12/2016 | Bennett | |
| 2016/0359546 A1 | 12/2016 | Bennett | |
| 2016/0359547 A1 | 12/2016 | Bennett et al. | |
| 2016/0360511 A1 | 12/2016 | Barzegar et al. | |
| 2016/0360533 A1 | 12/2016 | Bennett et al. | |
| 2016/0365966 A1 | 12/2016 | Bennett et al. | |
| 2017/0012667 A1 | 1/2017 | Bennett | |
| 2017/0018332 A1 | 1/2017 | Barzegar et al. | |
| 2017/0018856 A1 | 1/2017 | Henry et al. | |
| 2017/0033465 A1 | 2/2017 | Henry et al. | |
| 2017/0033953 A1 | 2/2017 | Henry et al. | |
| 2017/0033954 A1 | 2/2017 | Henry et al. | |
| 2017/0064716 A1 | 3/2017 | Niewczas | |
| 2017/0079037 A1 | 3/2017 | Gerszberg et al. | |
| 2017/0079038 A1 | 3/2017 | Gerszberg et al. | |
| 2017/0079039 A1 | 3/2017 | Gerszberg et al. | |
| 2017/0085003 A1 | 3/2017 | Johnson et al. | |
| 2017/0093693 A1 | 3/2017 | Barzegar et al. | |
| 2017/0110795 A1 | 4/2017 | Henry | |
| 2017/0110804 A1 | 4/2017 | Henry et al. | |
| 2017/0111805 A1 | 4/2017 | Barzegar et al. | |
| 2017/0156069 A1* | 6/2017 | Moshfeghi | H04W 24/02 |
| 2017/0229782 A1 | 8/2017 | Adriazola et al. | |
| 2018/0013452 A9 | 1/2018 | Henry et al. | |
| 2018/0048497 A1 | 2/2018 | Henry et al. | |
| 2018/0054232 A1 | 2/2018 | Henry et al. | |

(56) References Cited

U.S. PATENT DOCUMENTS

| | | | |
|---|---|---|---|
| 2018/0054233 A1 | 2/2018 | Henry et al. |
| 2018/0054234 A1 | 2/2018 | Stuckman et al. |
| 2018/0062886 A1 | 3/2018 | Shala et al. |
| 2018/0069594 A1 | 3/2018 | Henry et al. |
| 2018/0069731 A1 | 3/2018 | Henry et al. |
| 2018/0076982 A1 | 3/2018 | Henry et al. |
| 2018/0076988 A1 | 3/2018 | Willis, III et al. |
| 2018/0077709 A1 | 3/2018 | Gerszberg |
| 2018/0108997 A1 | 4/2018 | Henry et al. |
| 2018/0108998 A1 | 4/2018 | Henry et al. |
| 2018/0108999 A1 | 4/2018 | Henry et al. |
| 2018/0115040 A1 | 4/2018 | Bennett et al. |
| 2018/0115058 A1 | 4/2018 | Henry et al. |
| 2018/0115060 A1 | 4/2018 | Bennett et al. |
| 2018/0115075 A1 | 4/2018 | Bennett et al. |
| 2018/0115081 A1 | 4/2018 | Johnson et al. |
| 2018/0123207 A1 | 5/2018 | Henry et al. |
| 2018/0123208 A1 | 5/2018 | Henry et al. |
| 2018/0123643 A1 | 5/2018 | Henry et al. |
| 2018/0123836 A1 | 5/2018 | Henry et al. |
| 2018/0151957 A1 | 5/2018 | Bennett et al. |
| 2018/0159195 A1 | 6/2018 | Henry et al. |
| 2018/0159196 A1 | 6/2018 | Henry et al. |
| 2018/0159197 A1 | 6/2018 | Henry et al. |
| 2018/0159228 A1 | 6/2018 | Britz et al. |
| 2018/0159229 A1 | 6/2018 | Britz |
| 2018/0159230 A1 | 6/2018 | Henry et al. |
| 2018/0159232 A1 | 6/2018 | Henry et al. |
| 2018/0159235 A1 | 6/2018 | Wolniansky |
| 2018/0159238 A1 | 6/2018 | Wolniansky |
| 2018/0159240 A1 | 6/2018 | Henry et al. |
| 2018/0159243 A1 | 6/2018 | Britz et al. |
| 2018/0166761 A1 | 6/2018 | Henry et al. |
| 2018/0166784 A1 | 6/2018 | Johnson et al. |
| 2018/0166785 A1 | 6/2018 | Henry et al. |
| 2018/0166787 A1 | 6/2018 | Johnson et al. |
| 2018/0167130 A1 | 6/2018 | Vannucci |
| 2018/0167927 A1 | 6/2018 | Beattie, Jr. et al. |

FOREIGN PATENT DOCUMENTS

| | | |
|---|---|---|
| CN | 102934508 | 2/2013 |
| CN | 103036837 | 4/2013 |
| CN | 105594138 A | 5/2016 |
| EP | 0756392 | 1/1997 |
| IN | 7352/CHENP/2015 A | 7/2016 |
| JP | 2002111579 A | 4/2002 |
| JP | 2005503709 A | 2/2005 |
| WO | 2008117973 A1 | 10/2008 |
| WO | 2018106455 A1 | 6/2018 |
| WO | 2018106684 A1 | 6/2018 |
| WO | 2018106915 A1 | 6/2018 |

OTHER PUBLICATIONS

"International Search Report & Written Opinion", PCT/US2014/039746, dated Jan. 12, 2015.

Akalin, Tahsin et al., "Single-Wire Transmission Lines at Terahertz Frequencies", IEEE Transactions on Microwave Theory and Techniques, vol. 54, No. 6, 2006, 2762-2767.

Barlow, H. M. et al., "Surface Waves", 621.396.11 : 538.566, Paper No. 1482 Radio Section, 1953, pp. 329-341.

Corridor Systems, "A New Approach to Outdoor DAS Network Physical Layer Using E-Line Technology", Mar. 2011, 5 pages.

Goubau, Georg et al., "Investigation of a Surface-Wave Line for Long Distance Transmission", 1952, 263-267.

Goubau, Georg et al., "Investigations with a Model Surface Wave Transmission Line", IRE Transactions on Antennas and Propagation, 1957, 222-227.

Goubau, Georg, "Open Wire Lines", IRE Transactions on Microwave Theory and Techniques, 1956, 197-200.

Goubau, Georg, "Single-Conductor Surface-Wave Transmission Lines", Proceedings of the I.R.E., 1951, 619-624.

Goubau, Georg, "Surface Waves and Their Application to Transmission Lines", Radio Communication Branch, Coles Signal Laboratory, Mar. 10, 1950, 1119-1128.

Goubau, Georg, "Waves on Interfaces", IRE Transactions on Antennas and Propagation, Dec. 1959, 140-146.

Japan Patent Office, "JP Office Action dated Feb. 14, 2017", dated Feb. 14, 2017, 1-12.

Patent Cooperation Treaty, "International Search Report dated Sep. 4, 2017", PCT Application No. PCT/US17/36266 filed Jun. 7, 2017, pp. 1-12.

Ren-Bin, Zhong et al., "Surface plasmon wave propagation along single metal wire", Chin. Phys. B, vol. 21, No. 11, May 2, 2012, 9 pages.

Sommerfeld, A., "On the propagation of electrodynamic waves along a wire", Annals of Physics and Chemistry New Edition, vol. 67, No. 2, 1899, 72 pages.

Wang, Kanglin, "Dispersion of Surface Plasmon Polaritons on Metal Wires in the Terahertz Frequency Range", Physical Review Letters, PRL 96, 157401, 2006, 4 pages.

"Article 34 Amendment filed Apr. 10, 2018", for PCT Application No. PCT/US17/36266 filed Jun. 7, 2017, Apr. 10, 2018, 14 pages.

"International Search Report and Written Opinion", PCT/US2018/015634, dated Jun. 25, 2018, 8 pages.

Alam, M. N. et al., "Novel Surface Wave Exciters for Power Line Fault Detection and Communications", Department of Electrical Engineering, University of South Carolina, Antennas and Propagation (APSURSI), 2011 IEEE International Symposium, IEEE, 2011, 1-4.

Elmore, Glenn et al., "A Surface Wave Transmission Line", QEX, May/Jun. 2012, pp. 3-9.

Elmore, Glenn , "Introduction to the Propagating Wave on a Single Conductor", www.corridor.biz, Jul. 27, 2009, 30 pages.

European Patent Office, "For EP Application No. 14735737.0 filed Oct. 21, 2015", EP Office Action dated Jun. 18, 2018, dated Jun. 18, 2018, 7 pages.

Friedman, M et al., "Low-Loss RF Transport Over Long Distances", IEEE Transactions on Microwave Theory and Techniques, vol. 49, No. 2, Feb. 2001, 8 pages.

Wang, Hao et al., "Dielectric Loaded Substrate Integrated Waveguide (SIW)—Plan Horn Antennas", IEEE Transactions on Antennas and Propagation, IEEE Service Center, Piscataway, NJ, US, vol. 56, No. 3, Mar. 1, 2010, 640-647.

\* cited by examiner

REMOTE DISTRIBUTED ANTENNA SYSTEM

CROSS-REFERENCE TO RELATED APPLICATION(S)

This application is a continuation of U.S. patent application Ser. No. 15/158,798, filed May 19, 2016, which is a continuation of U.S. patent application Ser. No. 13/907,246, filed May 31, 2013 (which is now U.S. Pat. No. 9,525,524). All sections of the aforementioned application(s) are incorporated herein by reference in their entirety.

TECHNICAL FIELD

The subject disclosure relates to wireless communications, e.g., to providing a remote distributed antenna system using signals in defined bands, such as microwaves.

BACKGROUND

As smart phones and other portable devices increasingly become ubiquitous, and data usage skyrockets, macrocell base stations and existing wireless infrastructure are being overwhelmed. To provide additional mobile bandwidth, small cell deployment is being pursued, with microcells and picocells providing coverage for much smaller areas than traditional macrocells, but at high expense.

DETAILED DESCRIPTION

Figure 1:
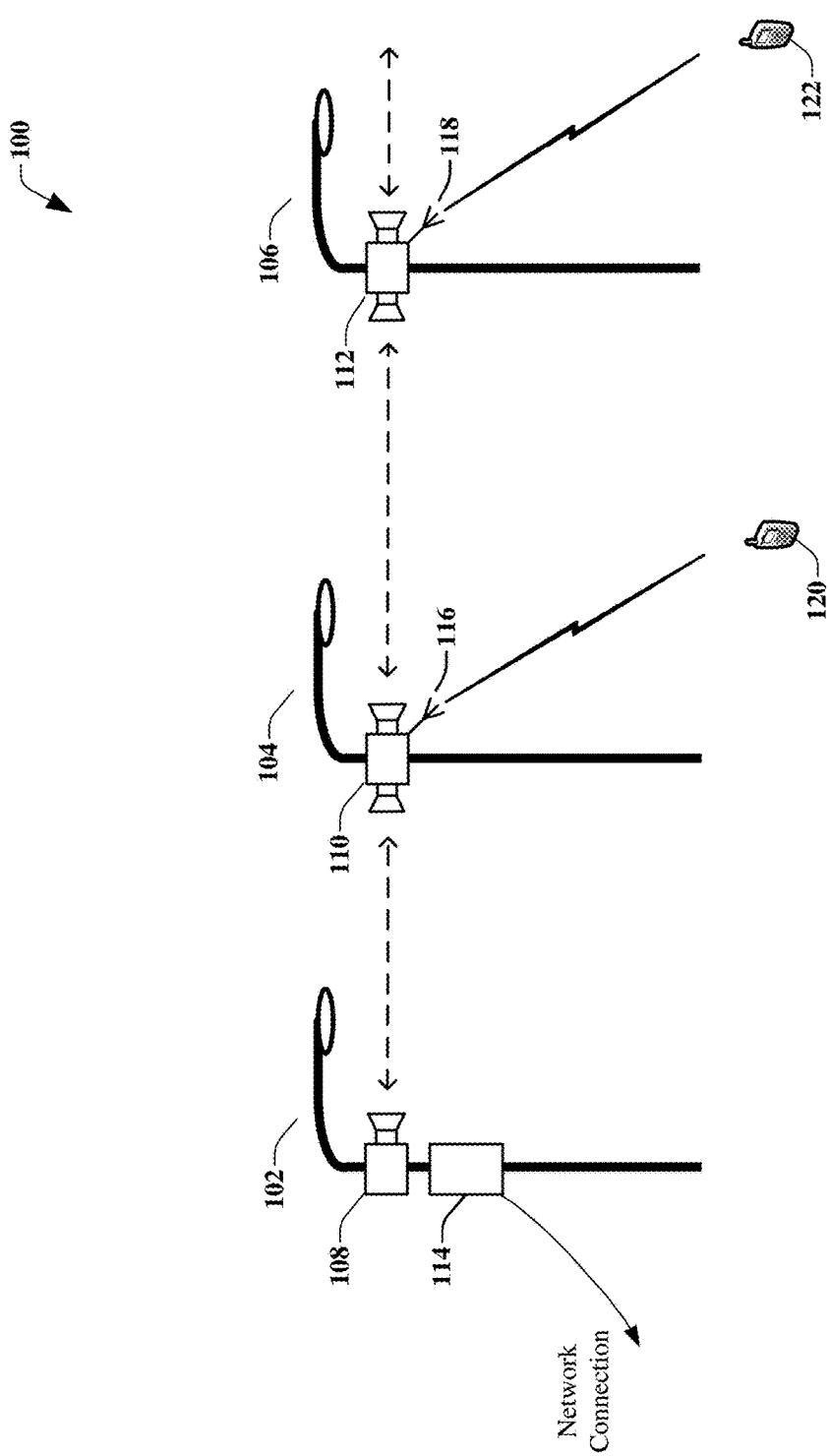
FIG. 1 is a block diagram illustrating an example, non-limiting embodiment of a distributed antenna system in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To provide network connectivity for increasing numbers of mobile devices, a distributed antenna system is provided that allows one or more base stations to have antennas that are distributed over a wide area. Small cell deployments can be used to supplement the traditional macrocellular deployments and require a pervasive and high capacity network to support them.

Various embodiments disclosed herein relate to a microwave system that carries the output signals of one or more microcells (or picocells, femtocells, and other types of small cell deployments) on a carrier wave that has a frequency corresponding to a millimeter-wave band (e.g., 60 GHz and higher). However, various embodiments disclosed here can operate at nearly any microwave frequency. A cluster of one or more microcell base station devices can be housed at a launching point, and serve several microcells in its vicinity. The RF (radio frequency) outputs of these microcell base station devices can be used to modulate a 60 GHz (or higher) carrier wave, yielding a group of subcarriers on the 60 GHz carrier wave. This group will then be transmitted in the air via an especially designed analog microwave RF unit, after which it can be repeated or radiated to the surrounding area. The repeaters amplify the signal and resend it on the air again toward the next repeater. In places where a microcell is required, the 60 GHz signal is shifted in frequency back to its original frequency (e.g., the 1.9 GHz cellular band) and radiated locally to nearby mobile devices.

As the 60 GHz carrier hops from one antenna site to the next, various subcarriers can be added or dropped depending on the traffic requirements of that site. The selection of channels to be added or dropped can be controlled dynamically as traffic loads shift. The return signals from the mobile devices can be modulated to another frequency in the 60 GHz range and can be sent back in the opposite direction to the original launching point. In another embodiment, time-division duplexing can be used and the return signals can be at the same frequency as the original signals. The repeaters thus essentially space shift the microcell base station devices from the launching point location to other places via radio hops from one utility pole to another. The launcher and repeaters can frequency shift the cellular signals via an analog process (modulating the carrier wave) in such a way the system is scalable and flexible, allowing additional microcells and antenna sites to be added as well as being communication protocol agnostic. The system disclosed herein will work for current cellular communication protocols just as well as it will work for future deployments.

For these considerations as well as other considerations, in one or more embodiments, a system includes a memory to store instructions and a processor, coupled to the memory to facilitate execution of the instructions to perform operations including facilitating receipt of a first signal from a base station device, wherein the first signal is determined to be in a cellular band. The operations include modulating a carrier wave signal with the first signal and generating a transmission based on the carrier wave signal and the first signal. The operations can also include directing the transmission to a remote antenna wirelessly.

Another embodiment includes a memory to store instructions and a processor, coupled to the memory to facilitate execution of the instructions to perform operations including receiving a first wireless transmission. The operations can also include extracting a signal from the first wireless transmission, where the signal is in a cellular band frequency. The operations can also include transmitting the signal to a mobile device and retransmitting the first wireless transmission.

In another embodiment, a method includes receiving, by a device including a processor, a defined high frequency transmission directed to a remote antenna. The method can also include identifying a signal from a plurality of signals, that is determined to be associated with the remote antenna, where the plurality of signals are carried in a plurality of channels with the defined high frequency transmission. The method can then include extracting the signal, transmitting the signal directed to a mobile device, and retransmitting the defined high frequency transmission directed to another remote antenna.

Turning now to FIG. 1, illustrated is an example, non-limiting embodiment of a distributed antenna system 100 in accordance with various aspects described herein. System 100 includes one or more microcell base stations (shown in more detail in FIGS. 3 and 5) at base station device 114 that is communicably coupled to a network connection via a physical connection (e.g., wired or optical) to a mobile network. In some embodiments, the base station device 114 can be communicably coupled to a macrocell site or the site's network connection. Macrocells can have dedicated connections to the mobile network, and base station device 114 can share the macrocell site's connection. Base station device 114 can be mounted on, or attached to light pole 102. In some embodiments, the base station device 114 can be mounted on utility poles, or other raised structures. In some embodiments, the base station device 114 can be installed on or near the ground.

Base station device 114 can provide connectivity for mobile devices 120 and 122. Antennas 116 and 118, mounted on or near launcher 108 or repeaters 110 and 112 on light poles (or utility poles or other structures) 102, 104, and 106 can receive signals from base station device 114 and transmit those signals to mobile devices 120 and 122 over a much wider area than if the antennas 116 and 118 were located at or near base station device 114.

It is to be appreciated that FIG. 1 displays three light poles, with one base station device, for purposes of simplicity. In other embodiments, light pole 102 can have more base station devices, and one or more light poles with distributed antennas are possible. In some embodiments, there can be launchers and/or repeaters without antennas. Antennas can be communicably coupled to launchers and/or repeaters in areas where microcell deployments are required or can be spaced out to avoid excessive overlap.

Launcher 108 can receive the signals from the base station device 114 that are directed at mobile devices 120 and 122 and modulate a 60 GHz carrier wave, yielding a group of subcarriers on the 60 GHz carrier. The launcher 108 can then transmit the carrier wave to repeaters within range, in this case, repeater 110. Repeater 110 can extract the signal directed toward mobile device 120 from the carrier wave, and radiate the signal to the mobile device 120 via antenna 116. Repeater 110 can then retransmit the carrier wave to repeater 112, where repeater 112 extracts the signal directed at mobile device 122 and radiates the signal via antenna 118. Repeater 112 can then retransmit the carrier wave transmission to the next repeater. The repeaters 110 and 112 can also amplify the transmission before retransmitting using a combination of low noise amplifiers and power amplifiers.

In various embodiments, the repeaters 110 and 112 and/or antennas 116 and 118 can be assigned to channels that correspond to predetermined bandwidth ranges in the carrier wave. The repeaters 110 and 112 can extract the assigned signals from the carrier wave, wherein the signals correspond to the channels and or bandwidths corresponding to the repeaters and/or antennas. In this way, the antennas 116 and 118 radiate the correct signal for the microcell area. In other embodiments, the carrier wave can include a control channel that contains metadata that indicates which of the subcarriers correspond to the antennas 116 and 118, and so repeaters 110 and 112 extract the appropriate signal.

As the 60 GHz carrier wave hops from one radiator site to another, various subcarriers can be added or dropped, depending on the traffic requirements of that site. The selection of channels to be added or dropped can be controlled dynamically as traffic load shifts.

When mobile devices 120 and/or 122 send signals back to the mobile network, antennas 116 and/or 118 receive those signals and repeaters 110 and/or 112 use the signals to modulate another carrier wave (e.g., are shifted to 60 GHz in the analog domain) and then the carrier wave is transmitted back to the launcher 108 where the signals from mobile devices 120 an/or 122 are extracted and delivered to base station device 114.

Figure 2:
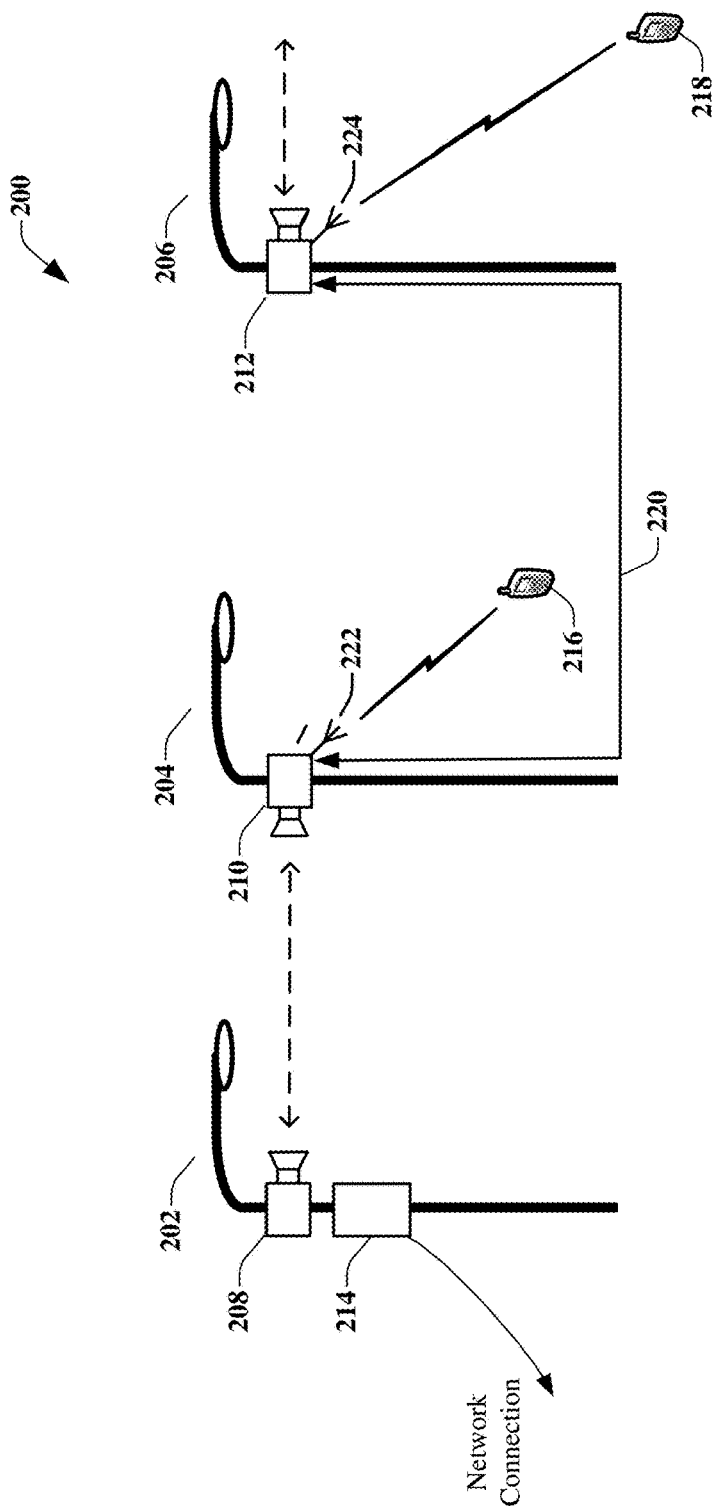
FIG. 2 is a block diagram illustrating an example, non-limiting embodiment of a distributed antenna system in accordance with various aspects described herein.

Turning now to FIG. 2, a block diagram illustrating an example, non-limiting embodiment of a distributed antenna system 200 in accordance with various aspects described herein is shown. System 200 includes one or more microcell base station devices (shown in more detail in FIGS. 3 and 5) at base station 214 that is communicably coupled to a network connection via a physical connection (e.g., wired or optical) to a mobile network. In some embodiments, the base station 214 can be communicably coupled to a macrocell site or the site's network connection. Macrocells can have dedicated connections to the mobile network, and base station 214 can share the macrocell site's network connection. Base station 214 can be mounted on, or attached to light pole 202. In some embodiments, the base station 214 can be mounted on utility poles, or other raised structures. In some embodiments, the base station 214 can be installed on or near the ground.

FIG. 2 depicts a different embodiment than that shown in FIG. 1. In FIG. 2, unlike in FIG. 1, the transmission hop between light poles 204 and 206 can be implemented using a carrier wave that is sent via a power line (e.g., a surface wave), or via an underground conduit (e.g., a pipe) as a guided electromagnetic wave. In some embodiments, the transmission 220 can be sent down a wire or other traditional datalink.

Whatever the transmission means, the functionality is similar to FIG. 1, where launcher 208 can receive the signals from the base station 214 that are directed at mobile devices 216 and 218 and modulate a 60 GHz carrier wave, yielding a group of subcarriers on the 60 GHz carrier. The launcher 208 can then transmit the carrier wave to repeaters within range, in this case, repeater 222. Repeater 210 can extract the signal directed toward mobile device 216 from the carrier wave, and radiate the signal to the mobile device 216 via antenna 222. Repeater 210 can then retransmit the carrier wave via the physical link or as a surface wave over a power line to repeater 212, where repeater 212 extracts the signal directed at mobile device 218 and radiates the signal via antenna 224. Repeater 212 can then retransmit the carrier wave transmission to the next repeater. The repeaters 210 and 212 can also amplify the transmission before retransmitting using a combination of low noise amplifiers and power amplifiers.

Figure 3:
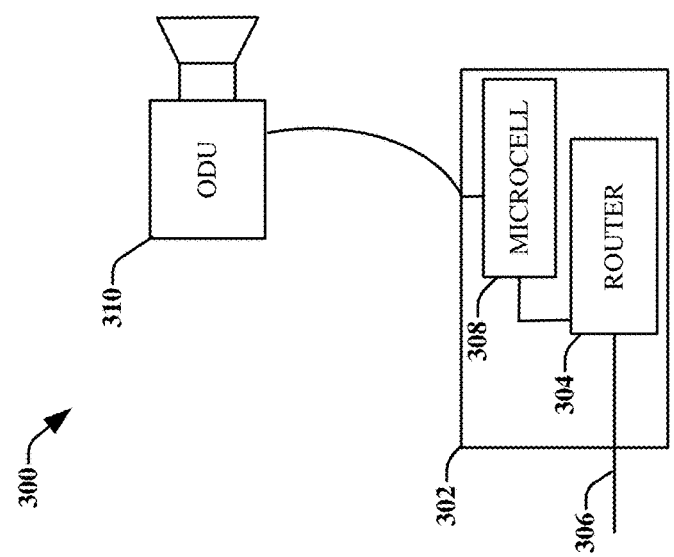
FIG. 3 is a block diagram illustrating an example, non-limiting embodiment of a distributed antenna launcher system in accordance with various aspects described herein.

Turning now to FIG. 3, illustrated is a block diagram of an example, non-limiting embodiment of a distributed antenna launcher system 300 in accordance with various aspects described herein. FIG. 3 shows in more detail the base station 104 and launcher 106 described in FIG. 1. A base station 302 can include a router 304 and a microcell base station device 308 (or picocell, femtocell, or other small cell deployment). The base station 302 can receive an external network connection 306 that is linked to existing infrastructure. The network connection 306 can be physical (such as fiber or cable) or wireless (such as a high-bandwidth microwave connection). The existing infrastructure that the network connection 306 can be linked to, can in some embodiments be macrocell sites. For those macrocell sites that have high data rate network connections, base station 302 can share the network connection with the macrocell site.

Figure 7:
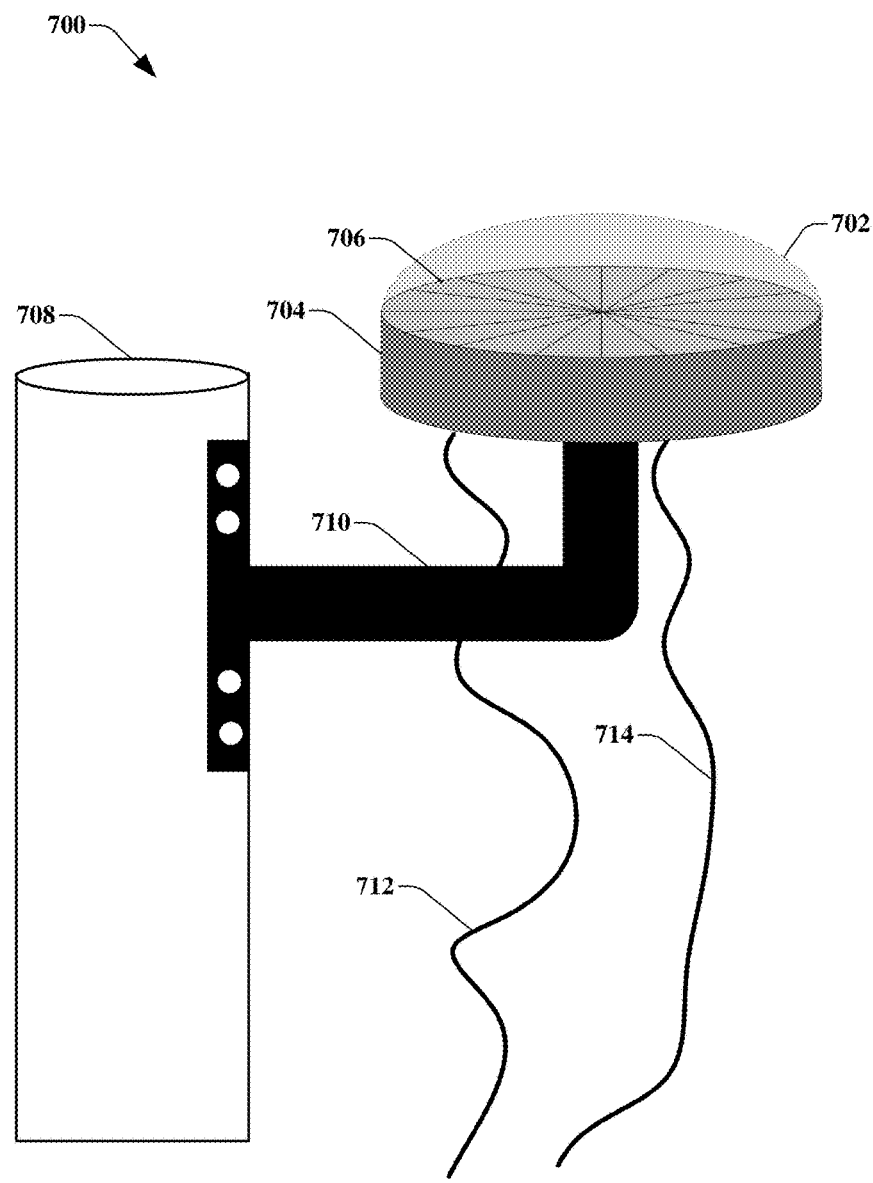
FIG. 7 is a block diagram illustrating an example, non-limiting embodiment of a millimeter band antenna apparatus in accordance with various aspects described herein.

The router 304 can provide connectivity for microcell base station device 308 which facilitates communications with the mobile devices. While FIG. 3 shows that base station 302 has one microcell base station device, in other embodiments, the base station 302 can include two or more microcell base station devices. The RF output of microcell base station device 308 can be used to modulate a 60 GHz signal and be connected via fiber to an out door unit ("ODU") 310. ODU 310 can be any of a variety of microwave antennas that can receive and transmit microwave signals. In some embodiments, ODU unit can be a millimeter-wave band antenna apparatus as shown in FIG. 7.

Figure 4:
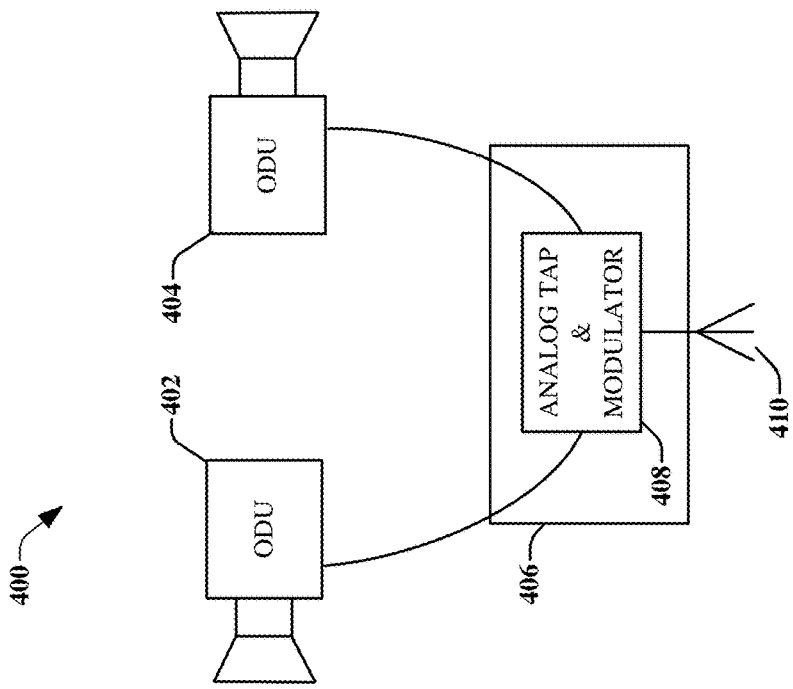
FIG. 4 is a block diagram illustrating an example, non-limiting embodiment of a distributed antenna repeater system in accordance with various aspects described herein.

Turning now to FIG. 4, a block diagram illustrating an example, non-limiting embodiment of a distributed antenna repeater system 400 in accordance with various aspects described herein is shown. ODU 402 can receive a millimeter-wave transmission sent from another ODU at a repeater or a launcher. The transmission can be a carrier wave with a plurality of subcarrier signals. A repeater 406 can receive the transmission and an analog tap and modulator 408 can extract a signal from the plurality of subcarrier signals and radiate the signal via an antenna 410 to a mobile device. The analog tap and modulator 408 can also amplify the transmission received by ODU 402 and retransmit the carrier wave to another repeater or launcher via ODU 404.

Antenna 410 can also receive a communication protocol signal from a mobile device, and analog tap and modulator 408 can use the signal to modulate another carrier wave, and ODUs 402 or 404 can send the carrier wave transmission on to a base station device.

Figure 5:
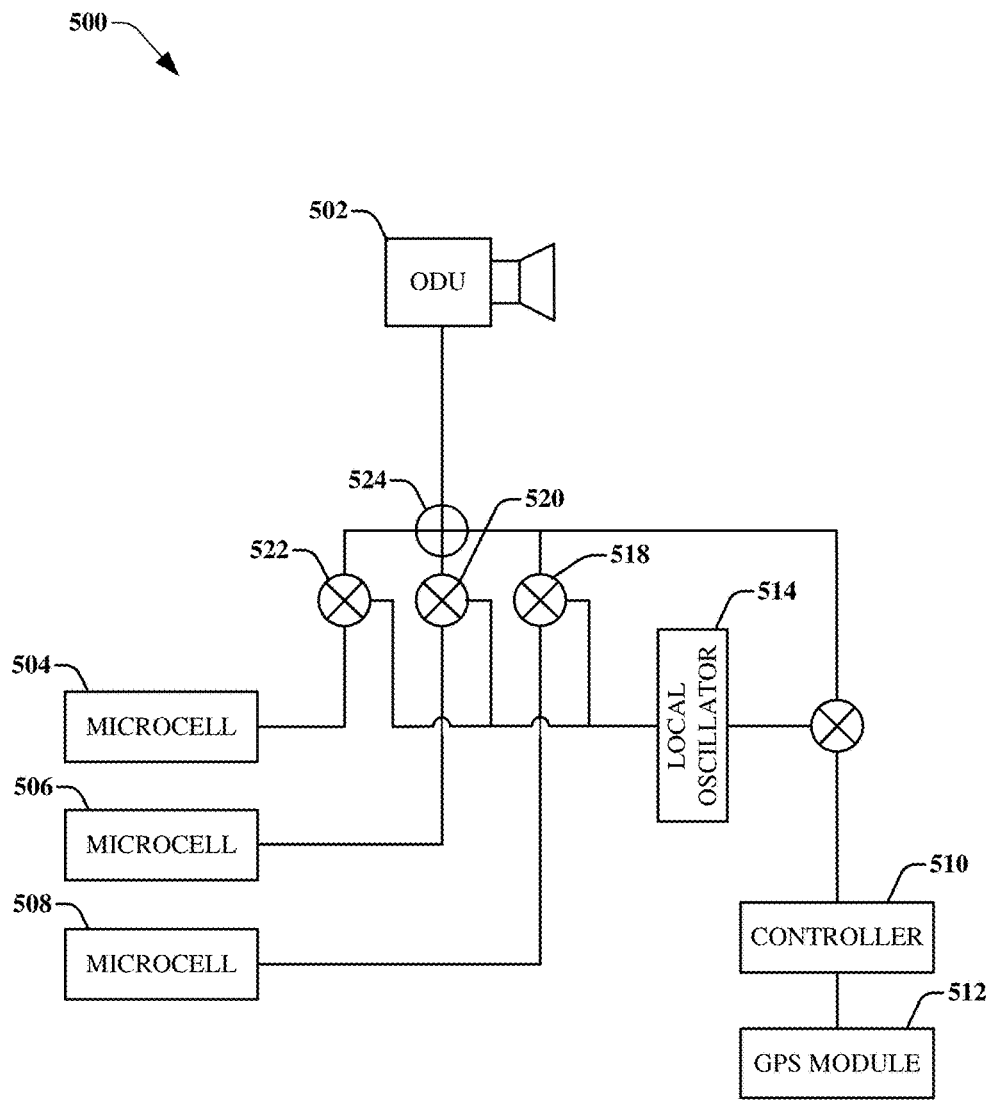
FIG. 5 is a block diagram illustrating an example, non-limiting embodiment of a distributed antenna launcher system in accordance with various aspects described herein.

With reference to FIG. 5, a block diagram illustrating an example, non-limiting embodiment of a distributed antenna launcher system 500 in accordance with various aspects described herein is shown. System 500 includes microcell base station devices 504, 506, and 508 that transmit to and receive signals from mobile devices that are in their respective cells. It is to be appreciated that system 500 is shown with 3 microcell base station devices purely for exemplary reasons. In other embodiments, a base station site, or cluster can contain one or more microcell base station devices.

The outputs of the microcell base station devices 504, 506, and 508 can be combined with a millimeter wave carrier wave generated by a local oscillator 514 at frequency mixers 522, 520, and 518 respectively. Frequency mixers 522, 520, and 518 can use heterodyning techniques to frequency shift the signals from microcell base station devices 504, 506, and 508. This can be done in the analog domain, and as a result the frequency shifting can be done without regard to the type of communications protocol that microcell base station devices 504, 506, and 508 use. Over time, as new communications technologies are developed, the microcell base station devices 504, 506, and 508 can be upgraded or replaced and the frequency shifting and transmission apparatus can remain, simplifying upgrades.

The controller 510 can generate the control signal that accompanies the carrier wave, and GPS module 512 can synchronize the frequencies for the control signal such that the exact frequencies can be determined. The GPS module 512 can also provide a time reference for the distributed antenna system.

Multiplexer/demultiplexer 524 can frequency division multiplex the signals from frequency mixers 518, 520, and 522 in accordance with the control signal from controller 510. Each of the signals can assigned channels on the carrier wave, and the control signal can provide information indicating the microcell signals that correspond to each channel.

ODU unit 502 can also receive transmissions sent by repeaters, where the transmission's carrier wave are carrying signals directed at the microcell base station devices 504, 506, and 508 from mobile devices. Multiplexer/demultiplexer 524 can separate the subcarrier signals from each other and direct them to the correct microcells based on the channels of the signals, or based on metadata in the control signal. The frequency mixers 518, 520, and 522 can then extract the signals from the carrier wave and direct the signals to the corresponding microcells.

Figure 6:
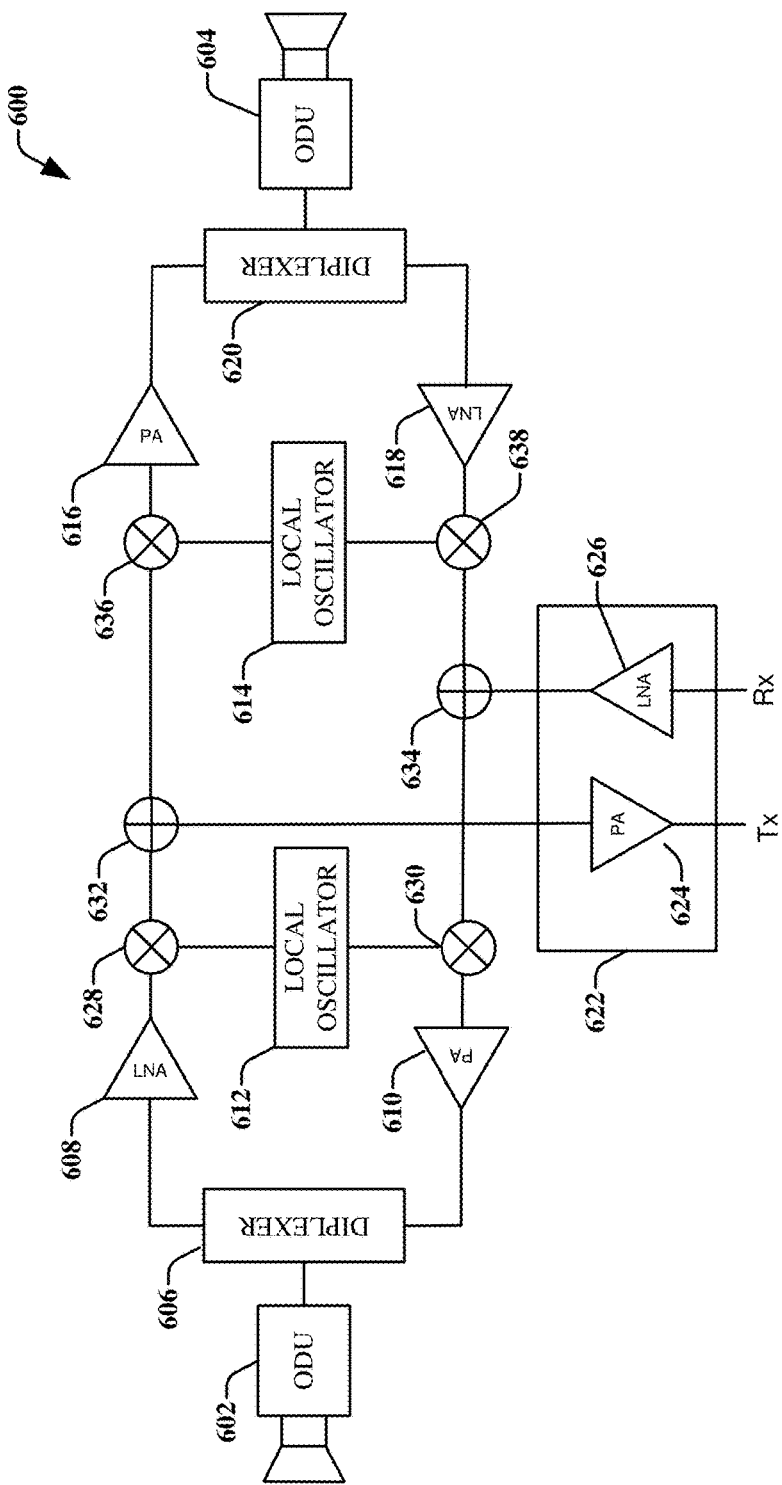
FIG. 6 is a block diagram illustrating an example, non-limiting embodiment of a distributed antenna repeater system in accordance with various aspects described herein.

Turning now to FIG. 6, a block diagram illustrating an example, non-limiting embodiment of a distributed antenna repeater system 600 in accordance with various aspects described herein is shown. Repeater system 600 includes ODUs 602 and 604 that receive and transmit transmissions from launchers and other repeaters.

In various embodiments, ODU 602 can receive a transmission from a launcher with a plurality of subcarriers. Diplexer 606 can separate the transmission from other transmissions that the ODU 602 is sending, and direct the transmission to low noise amplifier ("LNA") 608. A frequency mixer 628, with help from a local oscillator 612, can downshift the transmission (which is at or above 60 GHz) to the cellular band (~1.9 GHz). An extractor 632 can extract the signal on the subcarrier that corresponds to antenna 622 and direct the signal to the antenna 622. For the signals that are not being radiated at this antenna location, extractor 632 can redirect them to another frequency mixer 636, where the signals are used to modulate a carrier wave generated by local oscillator 614. The carrier wave, with its subcarriers, is directed to a power amplifier ("PA") 616 and is retransmitted by ODU 604 to another repeater, via diplexer 620.

At the antenna 622, a PA 624 can boost the signal for transmission to the mobile device. An LNA 626 can be used to amplify weak signals that are received from the mobile device and then send the signal to a multiplexer 634 which merges the signal with signals that have been received from ODU 604. The signals received from ODU 604 have been split by diplexer 620, and then passed through LNA 618, and downshifted in frequency by frequency mixer 638. When the signals are combined by multiplexer 634, they are upshifted in frequency by frequency mixer 630, and then boosted by PA 610, and transmitted back to the launcher or another repeater by ODU 602.

Turning now to FIG. 7, a block diagram illustrating an example, non-limiting embodiment of a millimeter-wave band antenna apparatus 700 in accordance with various aspects described herein is shown. The radio repeater 704 can have a plastic cover 702 to protect the radio antennas 706. The radio repeater 704 can be mounted to a utility pole, light pole, or other structure 708 with a mounting arm 710.

The radio repeater can also receive power via power cord 712 and output the signal to a nearby microcell using fiber or cable 714.

In some embodiments, the radio repeater 704 can include 16 antennas. These antennas can be arranged radially, and each can have approximately 24 degrees of azimuthal beamwidth. There can thus be a small overlap between each antennas beamwidths. The radio repeater 704, when transmitting, or receiving transmissions, can automatically select the best sector antenna to use for the connections based on signal measurements such as signal strength, signal to noise ratio, etc. Since the radio repeater 704 can automatically select the antennas to use, in one embodiment, precise antenna alignment is not implemented, nor are stringent requirements on mounting structure twist, tilt, and sway.

In some embodiments, the radio repeater 704 can include an apparatus such as repeater system 600 or 400 within the apparatus, thus enabling a self-contained unit to be a repeater in the distributed antenna network, in addition to facilitating communications with mobile devices.

Figure 8:
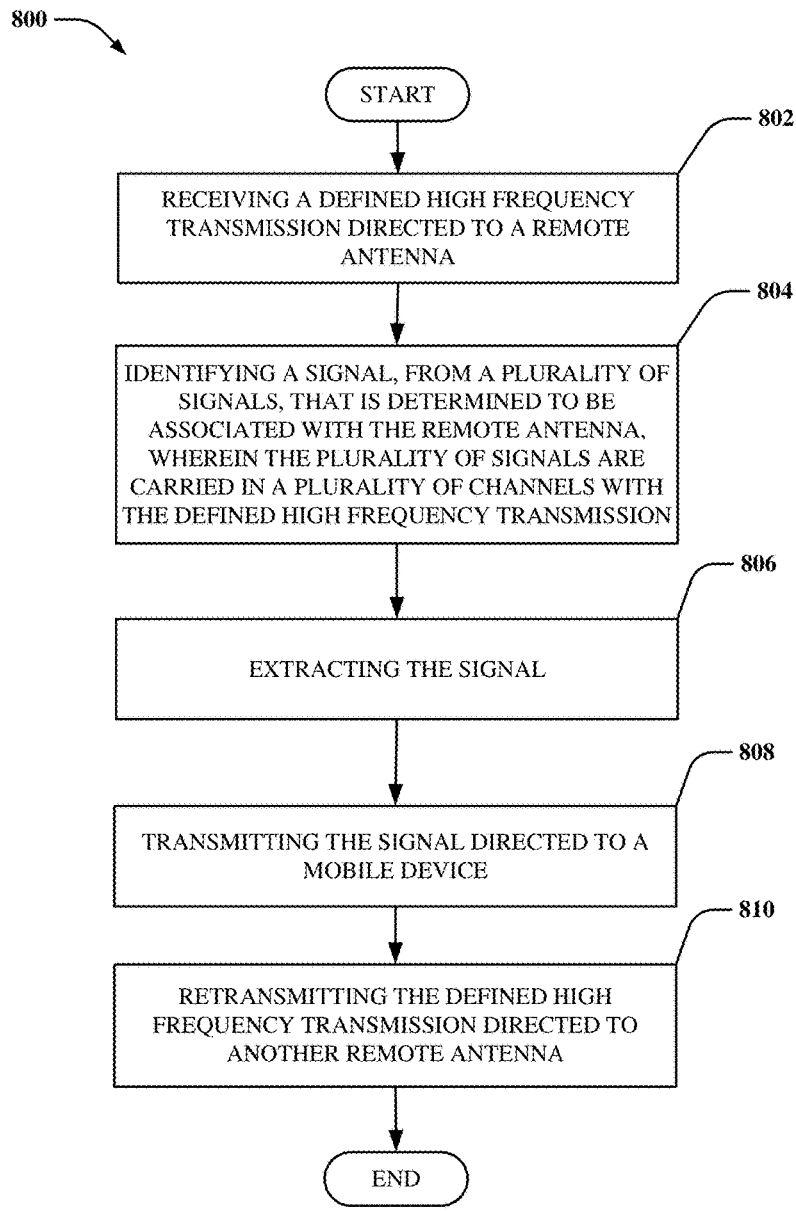
FIG. 8 illustrates a flow diagram of an example, non-limiting embodiment of a method for providing a distributed antenna system as described herein.

FIG. 8 illustrates a process in connection with the aforementioned systems. The process in FIG. 8 can be implemented for example by systems 100, 200, 300, 400, 500, 600, and 700 illustrated in FIGS. 1-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates a flow diagram of an example, non-limiting embodiment of a method for providing a distributed antenna system as described herein. Methodology 800 can include step 802, where a defined high frequency transmission is received from a remote antenna. The first defined frequency transmission can be at or greater than 60 GHz. The transmission can be received by an outdoor microwave transceiver (e.g., ODU 602 or radio repeater 704). At step 804, a signal, from a plurality of signals in the transmission, is identified and determined to be associated with the remote antenna (e.g., based on the control channel), and wherein the plurality of signals are carried in a plurality of channels with the defined high frequency transmission. The plurality of channels can be frequency division multiplexed together in some embodiments. The channel that the signals are occupying can determine which remote antenna the signals are directed towards, and at step 806, a frequency mixer (e.g., 628) and multiplexer/demultiplexer (e.g., 632) can extract the signal from the plurality of signals and shift the signal back to the native frequency of around 1.9 GHz. At step 808, the signal can be transmitted (e.g., by antenna 622) to a mobile device that the signal is directed towards. At 810, the defined frequency transmission can be retransmitted on towards another remote antenna and/or repeater in the chain.

Figure 9:
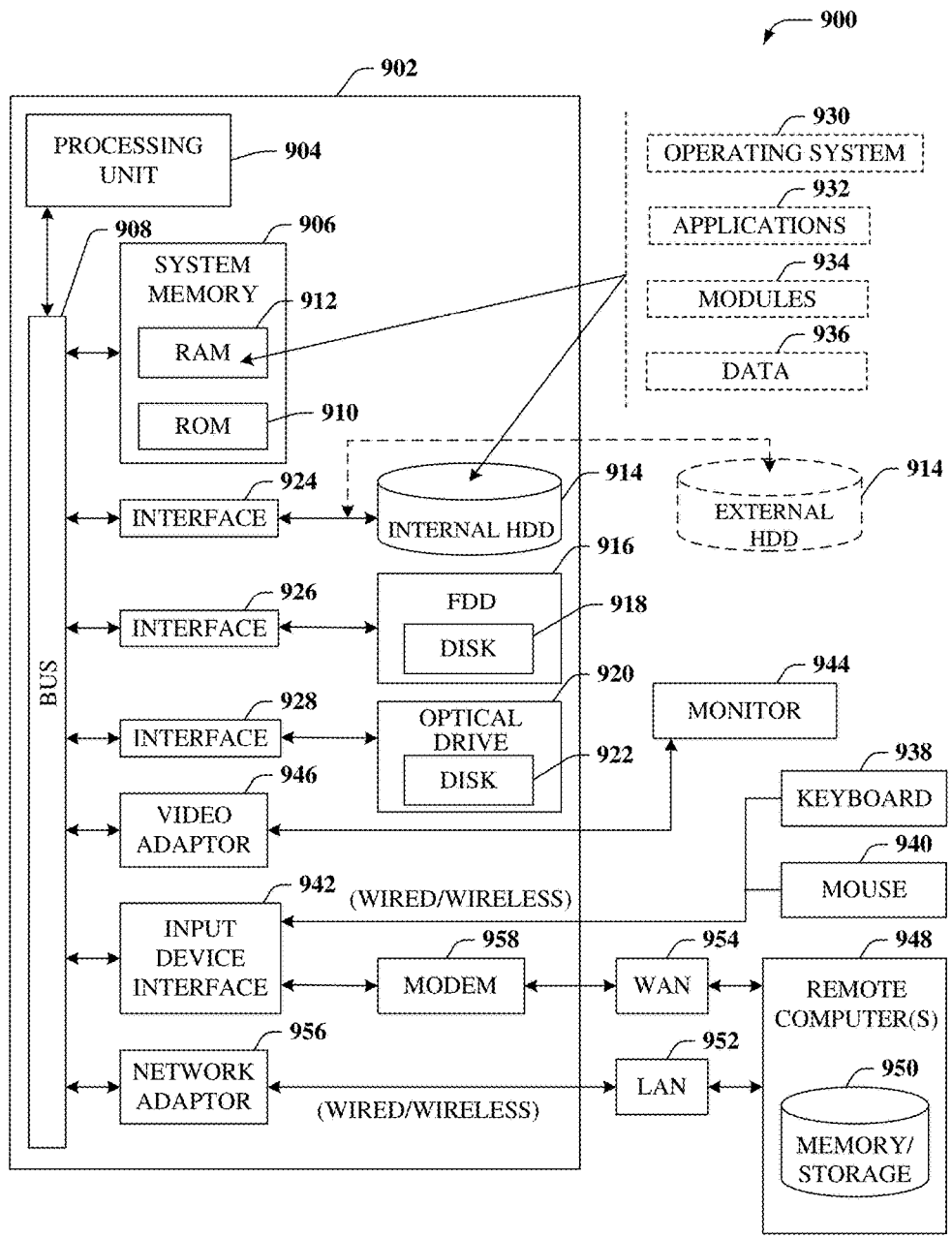
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the distributed antenna system disclosed in any of the previous systems 100, 200, 300, 400, 500, 600 and/or 700.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 10:
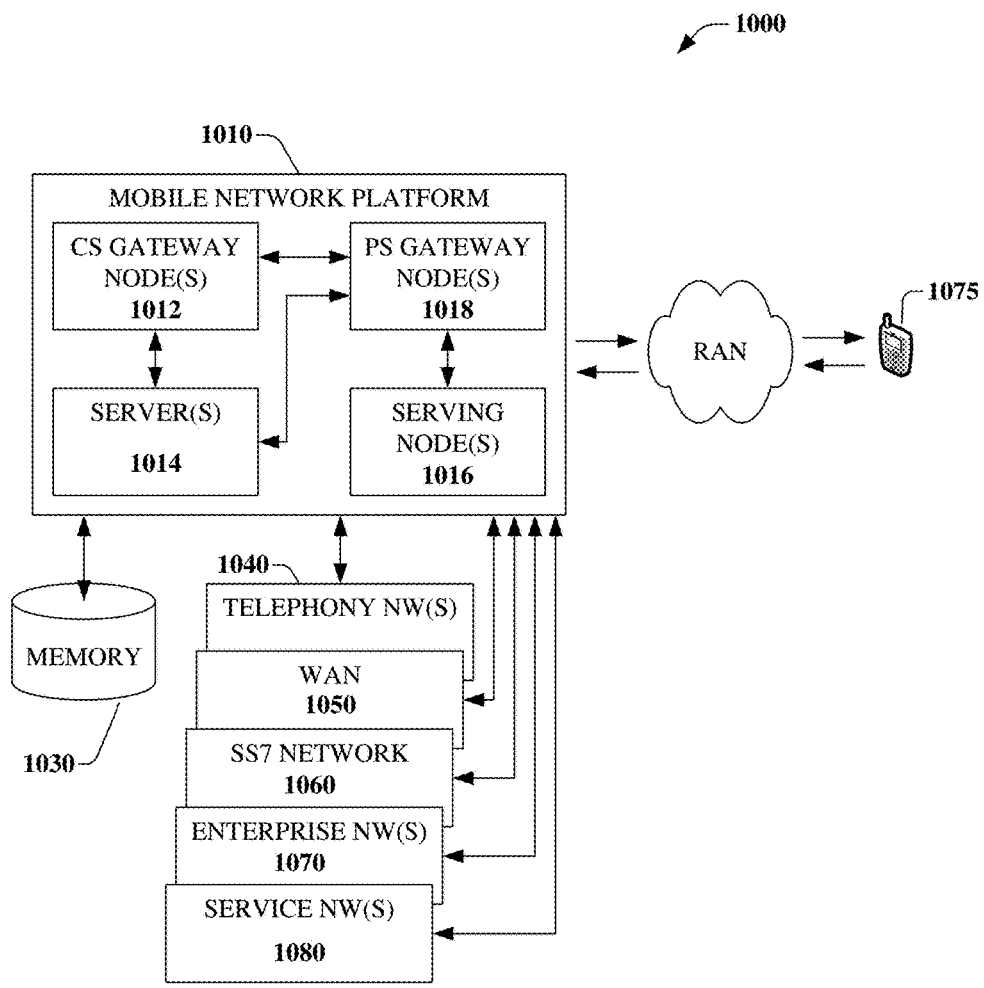
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=\text{confidence}$ (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory to store instructions; and
at least one processor, coupled to the memory, to execute the instructions to facilitate performance of operations, the operations comprising:
receiving a first guided electromagnetic wave guided by a transmission medium having an outer surface, the first guided electromagnetic wave conveying a first signal that had been modulated in a cellular band prior to the receiving;
mixing a carrier wave signal with the first signal to generate a frequency converted signal in the cellular band, wherein the first signal is obtained from the first guided electromagnetic wave; and
transmitting, by an antenna, a first wireless signal based on the frequency converted signal.

2. The system of claim 1, wherein the first signal comprises a set of subcarrier signals received from a set of base station devices.

3. The system of claim 2, wherein portions of the set of subcarrier signals are directed to respective sets of wireless communication devices.

4. The system of claim 2, wherein the set of subcarrier signals is combined by frequency division multiplexing.

5. The system of claim 2, wherein the first wireless signal comprises routing information that indicates to which wireless communication device, of a set of wireless communication devices, a subcarrier signal of the set of subcarrier signals received from the set of base station devices is directed.

6. The system of claim 1, wherein the first wireless signal has a higher frequency than the first signal that had been modulated in the cellular band.

7. The system of claim 1, wherein the first signal conforms to a mobile network communications protocol.

8. The system of claim 1, wherein the operations further comprise:
receiving, by the antenna, a second wireless signal from a wireless communication device, wherein the second wireless signal is in the cellular band;
extracting a second signal from the second wireless signal;
determining to which a base station device, of a set of base station devices, the second signal corresponds; and
sending the second signal to the base station device to which the second signal corresponds.

9. The system of claim 8, wherein the second signal is transmitted to the base station device, to which the second signal corresponds, by way of a second guided electromagnetic wave guided by the transmission medium.

10. A system, comprising:
a memory to store instructions; and
at least one processor, coupled to the memory, to execute the instructions to facilitate performance of operations, the operations comprising:
receiving, by an antenna, a first wireless signal in a cellular band, wherein the first wireless signal includes first data;
generating a first signal from the first wireless signal;
mixing a first carrier wave signal with the first signal to generate a first frequency converted signal in a millimeter-wave band; and
transmitting a first electromagnetic wave based on the first frequency converted signal, wherein the first electromagnetic wave is guided by a transmission medium having an outer surface.

11. The system of claim 10, wherein the operations further comprise:
receiving a second electromagnetic wave guided by the transmission medium;
generating a second signal from the second electromagnetic wave, the second signal including second data;
mixing a second carrier wave signal with the second signal to generate a second frequency converted signal in the cellular band; and
transmitting, by the antenna, a second wireless signal based on the second frequency converted signal.

12. The system of claim 11, wherein the second electromagnetic wave comprises an identifier that identifies a base station device that generated the second electromagnetic wave.

13. The system of claim 11, wherein the operations further comprise amplifying the second frequency converted signal with an amplifier before transmitting the second wireless signal.

14. The system of claim 10, wherein the operations further comprise improving a signal to noise ratio of the first wireless signal with an amplifier before generating the first signal.

15. The system of claim 10, wherein the first wireless signal comprises a plurality of signals including the first signal.

16. The system of claim 15, wherein the generating comprises selecting the first signal from the plurality of signals.

17. The system of claim 15, wherein the plurality of signals is combined by frequency division multiplexing.

18. A method, comprising:
receiving, by an antenna, a first wireless signal in a cellular band;
identifying, by a system, a first signal from a plurality of signals included in the first wireless signal, wherein the plurality of signals is carried in a plurality of channels;
generating, by the system, a first electromagnetic wave including the first signal obtained from the first wireless signal; and
coupling, by the system, the first electromagnetic wave to a transmission medium having an outer surface, wherein the first electromagnetic wave is guided by the transmission medium and is directed to a recipient device.

19. The method of claim 18, wherein the generating further comprises converting the first signal to a frequency converted signal in a millimeter-wave band.

20. The method of claim 18, further comprising:
receiving a second electromagnetic wave guided by the transmission medium;
generating a second signal from the second electromagnetic wave; and
transmitting, by the antenna, a second wireless signal including the second signal, the second wireless signal operating in the cellular band.

* * * * *